March 8, 1960

L. J. LYONS 2,927,785

CONVEYOR WEIGHING SCALE

Filed Sept. 13, 1955

INVENTOR
Lawrence J. Lyons
Paul L. Kesler
ATTORNEY

March 8, 1960

L. J. LYONS 2,927,785

CONVEYOR WEIGHING SCALE

Filed Sept. 13, 1955

INVENTOR
*Lawrence J. Lyons*

BY *Paul L. Krohn*

ATTORNEY

United States Patent Office 2,927,785
Patented Mar. 8, 1960

2,927,785

CONVEYOR WEIGHING SCALE

Lawrence J. Lyons, Davenport, Iowa, assignor to Fairbanks, Morse & Co., Chicago, Ill., a corporation of Illinois Application September 13, 1955, Serial No. 533,979

3 Claims. (Cl. 265—28)

This invention relates to conveyor weighing systems and more particularly to an electro-mechanical system including read out and totalizing indicators incorporated therein.

The primary object of this invention is to provide an electro-mechanical system for a conveyor weighing scale which will simultaneously give an operator information as to the percent of capacity load on the scale at any instant, the weight per increment of time output of the scale at any instant, and the total registration of weight which has passed over the scale.

A further object of this invention is to provide an electro-mechanical system for a conveyor weighing scale in which the percent of capacity load on the scale is electrically derived and indicated at any instant.

Another object of this invention is to provide an electro-mechanical system for a conveyor weighing scale in which the weight per increment of time is derived electrically for any instant of operation of the scale from a combination of two factors: weight on the scale at a given instant and conveyor belt speed.

A still further object of this invention is to provide an electro-mechanical system for a conveyor weighing scale in which the total weight indicator actuation is controlled electrically and mechanically in accordance with integrated information as to the weight on the scale and the belt speed at a given instant.

Another object of this invention is to provide an electrical system for a conveyor weighing scale which is rapid and accurate in controlling a plurality of read out indicators.

With the foregoing and other objects in view, the invention resides in the following specification and appended claims, certain embodiments and details of which are illustrated in the accompanying drawings in which:

Figure 1:
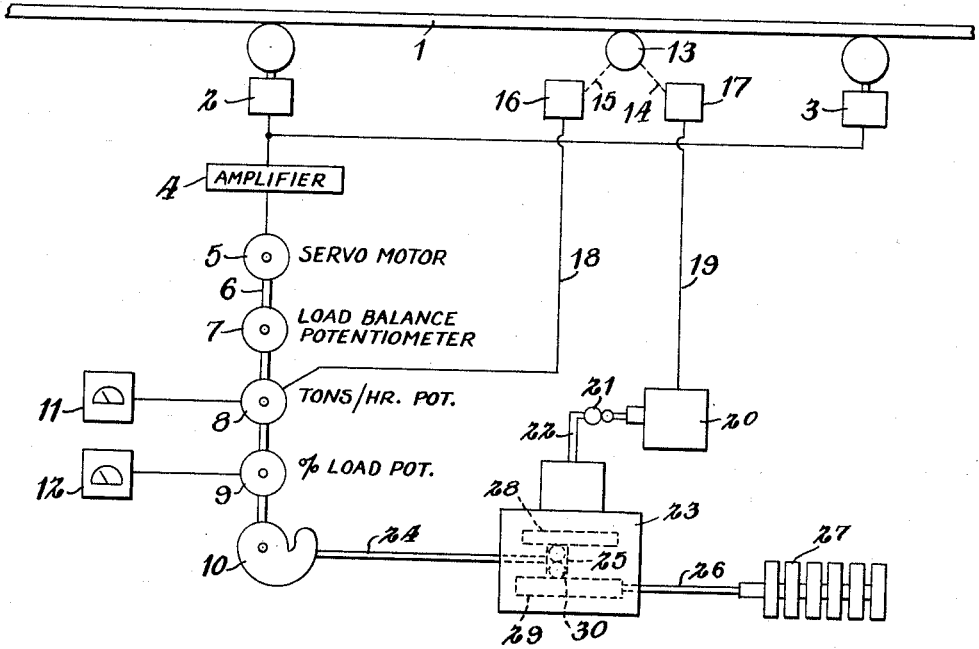
Figure 1 is a diagrammatic layout of the electro-mechanical system for the conveyor scale constituting the invention.

Referring more particularly to the Figure 1, a conveyor belt 1 is illustrated as being supported on strain gauge load cells 2 and 3. The structure for mounting the belt on the cells is fully disclosed in my copending application having Serial Number 534,079 and filed September 13, 1955, now Patent No. 2,882,036. The combined output of the cells 2 and 3 is fed to an amplifier 4 of any suitable type. The signal derived from the amplifier energizes a reversible servomotor 5 in one direction or the other to drive a shaft 6. Controlled in effect by the shaft 6 are: a load balance potentiometer 7, a tons per hour potentiometer 8, and a per cent of capacity load potentiometer 9, as well as a cam 10. Thus, when shaft 6 is rotated in either direction, elements 7, 8, 9, and 10 move simultaneously for purposes to be described.

Any adjustment of potentiometer 8 by shaft 6 will be readily apparent on the tons per hour meter 11 which is connected to the potentiometer 8. Any adjustment of the potentiometer 9 will be quickly apparent on the percent of capacity load meter 12.

Positioned in contact with belt 1 is a friction drive wheel 13 which is driven by the belt. The supporting structure for the wheel is disclosed in the above mentioned copending patent application. The wheel 13, when rotated, drives through suitable means represented as shafts 14 and 15 in the diagrammatic showing of Figures 1 and 2, a generator 16, and a synchro transmitter 17. The output signal of generator 16 is connected over conductor 18 to potentiometer 8. The output signal of synchro-transmitter 17 is connected over a conductor 19 to a synchro-receiver 20. Receiver 20 drives gearing 21 which delivers power through shaft 22 to a ball-disk integrator mechanism 23. Also mechanically and variably connected with mechanism 23 is a shaft 24 which abuts cam 10 at one end and controls the position of a ball cage mechanism 25 in integrator 23. The output side of the integrator 23 includes a shaft 26 which drives a standard digital counter 27.

The operation of the system of Figure 1 may be explained generally as follows:

The combined output from cells 2 and 3, proportional to varying loads passing over the same on belt 1, is fed to amplifier 4. The amplifier amplifies the load cell output and feeds it to the servo 5. The servo 5 rotates in one direction or the other, depending on whether the load cell voltage or the load balance voltage from potentiometer 7 predominates.

Shaft 6 is adjustably positioned by the motor and in moving adjusts the load balance potentiometer 7 to set up an opposing voltage to balance out the signal voltage from cells 2 and 3, at which time the servo motor 5 will stop moving. At the balanced condition, the potentiometers 8 and 9, which are preset in accordance with a certain maximum scale capacity, will have also been positioned by shaft 6 to give true indication of tons/hr. and percent load on meters 11 and 12. The output from generator 16, which is proportional to the speed of the belt, is utilized to assist in the adjustment of potentiometer 8 so that both weight and speed are seen to act on this potentiometer to give a true reading on indicator 11 in a manner to be discussed hereinafter.

Although other types of integrators may be utilized, this invention utilizes, in a novel combination, the ball-disk integrator mechanism 23. The integrator 23 integrates the speed of the belt 1 and the loading on the belt in order to give a totalized output in pounds or tons on the register 27. The integrator 23 includes a driving disc 28 and a driven roller 29 on opposite sides of and in contact with the balls 30 of the ball-cage mechanism 25. The disk 28 is driven through gearing 21 by the synchro-receiver 20 when the belt is moving. The speed of rotation of the roller 29, and hence the shaft 26, is dependent on the position of the ball-cage mechanism 25 with respect to the center line of driving disk 28 and which, as previously mentioned, is determined by the control cam 10 mounted on shaft 6. It is quite obvious that when the balls 30 are positioned at the exact center of disc 28, then there can be no movement of roller 30. Thus, if no weight is on the belt 1, as it travels over the cells 2 and 3, the cam 10 will position (by pre-calibration) the balls 30 at the center of disk 28, so that no matter how fast the disk 28 rotates in response to belt travel, there will be no transmission to roller 29 and hence no operation of the register 27. When a load is on the scale, the cam 10 will be positioned by shaft 6 to permit shaft 24 to movement to the left in Figure 1—moving the balls 30 from the dead position at the center of disk 28 toward the periphery of disk 28. Obviously the closer the balls 30 are to the periphery of disk 28, the faster roller 29 will rotate. It is further to be noted that if belt 1 is loaded, but is not moving, then disk 28 will not rotate and hence the roller 29 will not move. Thus the two factors of belt speed and belt loading are properly correlated through the integrator 23 to register at counter 27, continuously, the total weight of material which has passed over the scale.

Figure 2:
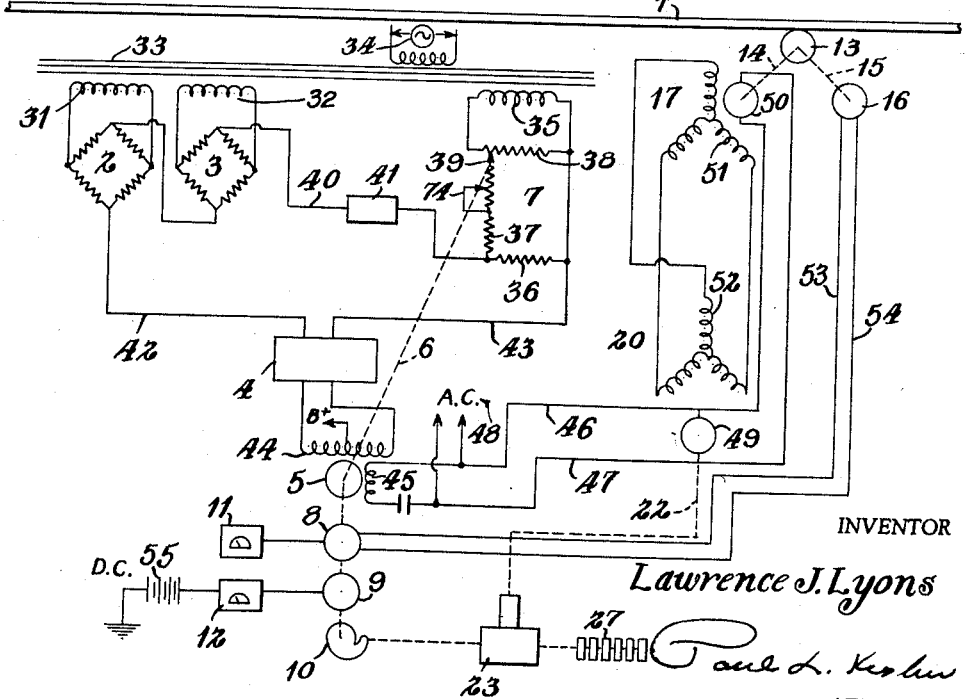
Figure 2 is a schematic diagram partially in block form of the electrical system of the invention.

A more detailed showing of the electrical system is illustrated in Figure 2. Load cells 2 and 3 are shown in the form of series connected bridge type resistance strain gauges. The cells 2 and 3 are connected by secondaries 31 and 32 of a transformer 33 to source of alternating current 34. Also connected to source 34 over a secondary winding 35 of transformer 33, is the load balance potentiometer circuit 7. Potentiometer circuit 7 is in the form of a bridge with two fixed resistors 36 and 37 and a variable resistor 38.

The terminal end of resistor 37 is connected to a movable contactor arm 39 which moves along resistor 38 under the control of shaft 6. The potentiometer 7 is series-connected in phase opposition over a conductor 40 to the cells 2 and 3 through a zero balance bridge 41 which is illustrated in block form. The output voltage signal from the cells 2 and 3 is fed through a line 42 to amplifier 4. The output signal from the potentiometer is fed through a line 43 to the amplifier 4. The amplified signals are fed into either end of a control winding 44 of the two-phase servo-motor 5 in bucking relationship. The dominant signal in winding 44 will control the direction of rotation of motor 5. When the signals are exactly equal in magnitude, the motor 5 will not rotate. These signals will remain equal only when the load passing over the scale remains constant, which seldom occurs in a conveyor scale, and hence the motor 5 is almost continuously moving in one direction of rotation or the other to adjust arm 39 on bridge 7 to maintain an opposing voltage equal to the cell voltage.

The second phase winding 45 of motor 5 is fed with a constant alternating current from lines 46 and 47 which are connected to a suitable source of A.C. 48. Also connected across lines 46 and 47 are a rotor 49 of the receiving synchro 20 and a similar rotor 50 of the transmitting synchro 17 by means such as slip rings (not shown). When the rotor 50 is driven by wheel 13 through shaft 14 in response to belt travel, the remotely located rotor 49 will follow the rotation due to the interconnected field windings 51 and 52 of synchros 17 and 20, respectively. Since the rotor 49 is connected through shaft 22 to the integrator 23, then the disk 28 of the integrator will be proportionately driven relative to the speed of the belt. The D.C. generator 16, also driven by wheel 13 over shaft 15, is connected by lines 53 and 54 to the potentiometer 8. The output voltage from generator 16 is proportional to speed of wheel 13, and hence the speed of belt 1. Hence, the potentiometer 8 combines the speed of the belt factor with the percent of capacity load factor on the belt at any instant to obtain a reading on meter 11 of weight per increment of time. The percent of capacity load meter 12 is connected directly to a source of D.C. supply 55.

Figure 3:
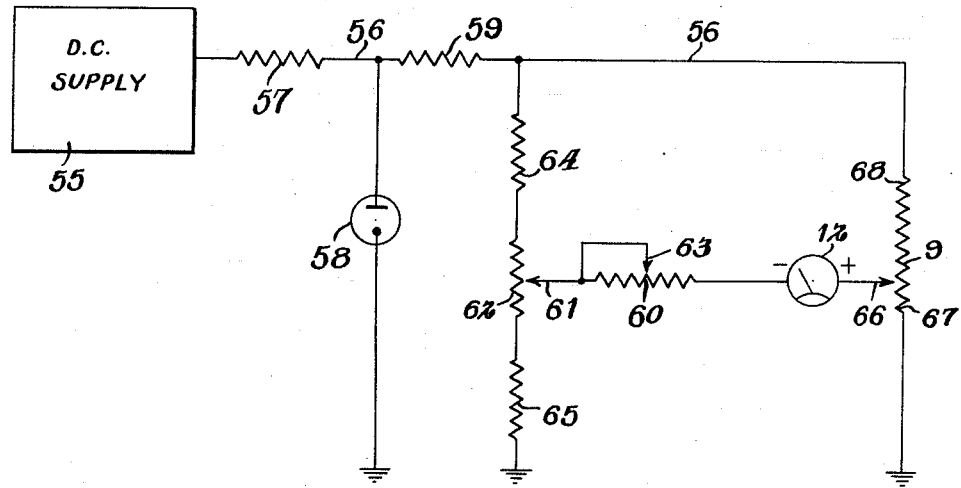
Figure 3 is a schematic diagram of the circuit for the percent of capacity load meter.

Figure 3 illustrates schematically the circuitry of the meter 12 and the potentiometer 9. The circuit is connected by a line 56 through a series resistor 57 to the D.C. supply 55. A voltage regulator for the circuit is included at 58. Such voltage regulator may be a voltage regulator tube of the type OA2 or its equivalent. A second series resistor 59 is connected in line 56 to lower the actual voltage drop across the meter portion of the circuit. The meter 12 is connected through an adjustable resistance 60 to the contactor arm 61 of variable resistor 62. The resistor 60 has an adjustment arm 63 which may be moved along the resistor to vary the span of measurement of meter 12. The arm 61 may be adjusted on resistor 62 to zeroize the meter. Fixed resistors 64 and 65 are series-connected with resistor 62 between line 56 and ground.

The other side of meter 12 is connected to the movable contactor arm 66 on the load potentiometer 9. The extreme ends 67 and 68 of potentiometer 9 represent zero and one hundred percent load, respectively. The arm 66 is placed at position 67 and the arm 61 is adjusted until the meter 12 is reading zero. Then during a weighing operation, when the shaft 6 is rotated by the servomotor 5, the arm 66 will be moved by the shaft 6 to upset the balance of the resistor bridge circuit of the meter, thereby giving a calibrated reading in percent of capacity load on the scale at any instant.

Figure 4:
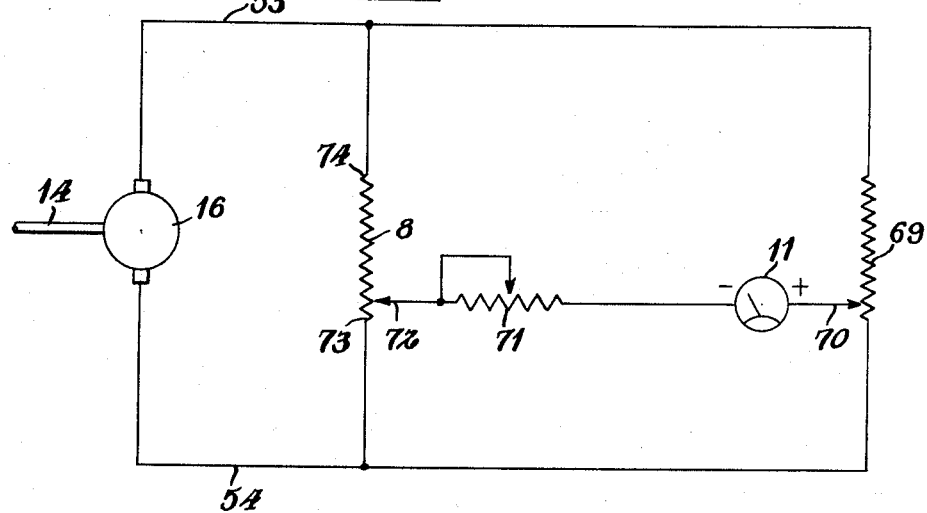
Figure 4 is a schematic diagram of the circuit for the weight per increment of time meter, or tons per hour meter.

Figure 4 illustrates schematically the circuitry of the meter 11 and the potentiometer 8. The potentiometer 8 is connected in parallel with a resistor 69 across lines 53 and 54 from generator 16. The meter 11 is connected on one side to resistor 69 through a zeroing adjustment arm 70. On the other side the meter is connected through a span adjustment resistor 71 to potentiometer 8 through movable contactor arm 72. The arm 72 is controlled in position by the movement of shaft 6 during load weighing operations. The positions 73 and 74 on potentiometer 8 represent zero and one hundred percent load capacity. The meter 11 is originally set by moving arm 72 to position 73 and adjusting arm 70 to obtain a zero reading of the meter. Then, when arm 72 is moved during a weighing operation the meter will be moved away from zero in accordance with the voltage from generator 16 and the instantaneous position of arm 72 on potentiometer 9. If the belt 1 is not moving, but is loaded, there will be no voltage developed by generator 16 and hence the meter 11 will continue to give a zero reading. If the belt is travelling with no applied load, the arm 72 will remain at position 73, maintaining the present balance between the potentiometer 8 and resistor 69 and hence the meter will indicate zero weight per increment of time. With the belt moving and loaded, the position of the arm 72 and the voltage developed by generator 16, both variable factors, will combine to give an indication on meter 11 of the weight per increment of time passing over the scale at any instant.

While the preferred embodiment of Figure 4 illustrates a direct current generator, it will be apparent that an alternating current generator may be substituted therefor without departing from the invention. The only required change necessitated by this substitution would be the insertion of an A.C. meter for D.C. meter 11.

In order to function properly to give correct indications, for example if the capacity of the belt 1 were thirty tons per hour, it is necessary that the speed of the disk 28 in the integrator 23 be such as to drive the roller 29 through the balls 30 to register thirty tons on the counter 27 at the end of one hour. To accomplish this the proper ratio for gearing 21 is preselected according to the capacity of the scale. This either steps up or down the speed of the disk 28 to arrive at the proper counter rate per unit of time. Also essential to proper counter operation is the position of the cam. It is set on shaft 6 during calibration so that the ball-cage controlled by the cam 10 through shaft 34 will be adjacent the periphery of the disk 28 under capacity loading of belt 1. The adjustment of the cam position is actually accomplished electrically in the load balance potentiometer 7 by means of the span adjustment arm 74 on resistor 37. Varying the position of arm 74 will effectively vary the opposing voltage produced by potentiometer 7 and consequently the balanced or stationary position of shaft 6 carrying cam 10 is varied accordingly.

The complete indicating and counter mechanisms may be remotely positioned from the conveyor belt 1 and scale proper, as illustrated in the aforementioned copending application. Thus, in large operations, one operator can conveniently check the various meters connected to several different conveyor scales from one central station.

The response time from zero to full capacity of this conveyor scale electromechanical system was found during experimentation to be on the order of eight tenths of one second, thus affording extremely rapid indications of actual instantaneous loading, the weight per increment of time and the total weight.

It is, therefore, obvious to those skilled in the art that this invention provides such novel features as to render it a marked advancement over conveyor weighing scales of the prior art.

I claim:

1. A conveyor weighing scale with a load carrying belt comprising electrical means to sense the weight of a load on the belt and produce a voltage proportional thereto, a shaft, cam means carried on the shaft, means mechanically coupled to the shaft and electrically connected to the sensing means to produce voltage opposing the voltage developed by the load sensing means, electric motor means connected to said shaft and operatively rotatable therewith in either direction in response to the voltage difference between the voltage from the electrical means and the voltage from the opposing voltage producing means to drive the shaft and thereby adjust the opposing voltage means toward an electrical balance with the electrical means voltage and to adjust the cam means, belt speed responsive means, integrator means driven by said belt speed responsive means and adjusted continuously by means operatively connected to said integrator and responsive to movement of said cam means, and indicator means actuated by said integrator means to indicate the total weight of loads which have passed over the scale.

2. A conveyor weighing scale with a load carrying belt comprising an electrical system to develop a voltage proportional to the weight applied to the belt and balance out said voltage electrically, a cam, means controlled by the electrical system to position the cam in accordance with a balanced electrical condition, an integrator having a driven member, an output member and an intermediate coupling member between said driven member and said output member, said intermediate member being operable to change the rate of response of said output member with respect to said driven member in accordance with the relative position of said intermediate member with respect to said driven member, a cam follower operatively connected to said cam and to said intermediate member to change the said relative position of said intermediate member in accordance with the position of said cam, means connected to said driven member and responsive to the speed of the belt to drive the integrator, and an indicator means actuated by the integrator to indicate the total weight of loads which have passed over the scale.

3. A conveyor weighing scale with a load carrying belt comprising an electrical system to develop a voltage proportional to the weight applied to the belt and to balance out said voltage electrically, a cam, means controlled by the electrical system to position the cam in accordance with a balanced electrical condition, an integrator having a driven member, an output member and an intermediate coupling member between said driven member and said output member, said intermediate member being operable to change the rate of response of said output member with respect to said driven member in accordance with the relative position of said intermediate member with respect to said driven member, a cam follower operatively connected to said cam and to said intermediate member to change the said relative position of said intermediate member in accordance with the position of said cam, a synchro-transmitter driven by the belt, a synchro-receiver actuated in accordance with the transmitter and driving the integrator, connected to said driven member for an indicator actuated by the integrator to indicate the total weight of loads which have passed over the scale.

References Cited in the file of this patent

UNITED STATES PATENTS

| | | |
|---|---|---|
| 1,163,678 | Messiter | Dec. 14, 1915 |
| 1,174,337 | Messiter | Mar. 7, 1916 |
| 1,298,302 | Davis | Mar. 25, 1919 |
| 1,435,250 | Moakley | Nov. 14, 1922 |
| 1,605,116 | Kellum | Nov. 2, 1926 |
| 1,608,796 | Keune | Nov. 30, 1926 |
| 2,261,655 | Lowe | Nov. 4, 1941 |
| 2,422,167 | Hem | June 10, 1947 |
| 2,598,812 | Marco | June 3, 1952 |
| 2,610,052 | Macgeorge | Sept. 9, 1952 |
| 2,630,007 | Howe | Mar. 3, 1953 |
| 2,689,932 | Hornfeck | Sept. 21, 1954 |
| 2,746,739 | Philippovic | May 22, 1956 |
| 2,766,981 | Lauler et al. | Oct. 16, 1956 |
| 2,786,669 | Safford et al. | Mar. 26, 1957 |